United States Patent Office 2,960,405
Patented Nov. 15, 1960

2,960,405

PEPTIZING SILVER-HALIDES WITH MODIFIED CASEIN

Fritz Dersch, Binghamton, and William A. Wurth, Jr., Johnson City, N.Y., assignors to General Aniline & Film Corporation, New York, N.Y., a corporation of Delaware No Drawing. Filed Nov. 21, 1956, Ser. No. 623,540

6 Claims. (Cl. 96—94)

This invention relates to the use of modified casein in the preparation of silver-halide dispersions.

In the preparation of photographic emulsions it has become common practice to employ animal gelatin as the carrier for the sensitive silver-halide salts. However, this method of preparing photographic emulsions has certain limitations due to the physical peculiarities of the gelatin. These limitations can be enumerated as follows:

(1) Gelatin exhibits poor compatibility with various materials and additives employed in photographic materials.

(2) It is extremely difficult to prepare silver-halide emulsions with a high silver-halide gelatin ratio or to coat highly diluted emulsions when gelatin is used as the peptizer and vehicle for silver salts.

(3) The washing of shredded silver-halide-gelatin emulsions is very time-consuming.

While the above shortcomings of gelatin have led to extensive investigation into the use of other proteins as carriers for silver-halide salts, such proteins were generally found to be unsatisfactory because of various deleterious characteristics from a photographic standpoint. These non-gelatin proteins suffer from such photographic limitations as tendency to cause excessive fog, large content of sulfur, exhibition of uncontrolled sulfur sensitizing, and display of ripening restraint and anti-sensitizing action. Also, these non-gelatin proteins often possess certain physical disadvantages such as undesirable solubility properties resulting in peptizing procedures which requires special conditions such as the use of a high pH.

It is therefore an object of this invention to provide non-gelatin protein carriers for silver-halides which are free from the aforementioned photographic limitations.

Another object is to facilitate and shorten the washing of silver-halide suspensions.

A further object of this invention is to provide a method of preparing silver-halide emulsions of high ratio of silver-halide to colloid.

A still further object of this invention is to provide a means of preparing silver-halide dispersions in a dried stage for the purpose of easier transporting and storing of the product.

Other objects and advantages will appear as the description proceeds.

It has now been discovered that certain modified caseins or caseinates are uniquely suited as carriers for the sensitive silver-halide salts in photographic emulsions.

Th modified casein used herein is described in U.S. Patent 2,293,385 and is produced by dissolving rennet casein in an aqueous solution of $M_4P_2O_7$ in which M is an alkali metal, allowing the insoluble matter to settle and separating the clear solution. This product can be obtained from the Borden Company under the trade name of "Protovac PV-401."

The modified casein of this invention can be used as a carrier for silver-halide suspensions at a pH of 6.5 or higher, or at a pH of from 2.0 to 3.5. The silver-halide-modified casein emulsion prepared at a pH of 6.5 or higher, will coagulate at a pH below 6.5 and the silver-halide-modified casein emulsion prepared at a pH range of 2.0 to 3.5 will coagulate in the pH range of 3.5 to 6.5. The coagulated protein will protect the silver-halide grain when so precipitated. This precipitate can easily be washed with water and subsequently resuspended in aqueous gelatin solution of the desirable concentration. Moreover, our invention will make it possible to prepare emulsions of high silver concentrations.

When the aforesaid modified casein is employed as a protective colloid, substantially the same quantity as that of gelatin may be used. Also the technique of adding silver nitrate solution to potassium halide solution in the presence of our proposed colloid and the mixing of the constituents are the same as those conventionally employed and the same is true of the temperature at which the precipitation is carried out. However, there are cases where elevated temperatures are less harmful in the presence of the modified casein than in the presence of photographic gelatin.

After the silver-halide has been formed and after any desirable ripening, a non-oxidizing acid such as sulfuric is added in a sufficient amount to lower the pH to less than 6.5 in those cases where "neutral" emulsions or "ammonia" emulsions are desired. In cases where "acid" emulsions are required, the precipitation is effected by adding an alkaline medium such as sodium hydroxide, sodium carbonate or the like until the pH is above 3.5. The precipitate consisting of silver-halide grains surrounded by the modified casein will settle to the bottom and the supernatent liquid may be siphoned off. The remaining precipitate may be rinsed or washed with water as many times as is necessary in order to remove any undesirable ions. When preparing paper emulsions, this washing may not be necessary but for the preparation of film emulsions thorough washing is essential and may be controlled by reference to the bromide ion concentration.

The precipitate which has been washed may then be redispersed in gelatin, casein, or any of the other usual photographic colloids such as polyvinyl alcohol (PVA). The precipitate is, for example, treated with water, gelatin, and any other additives at approximately 60–80° C. at a pH of 7–8.5 for sufficient time to complete reconstitution. The emulsions thus obtained resemble those obtained with the commonly known methods and respond very well to known chemical and optical sensitizing. Standard coating techniques may be applied to coat the resulting emulsions.

The following examples will serve to illustrate the invention but it is to be understood the invention is not restricted thereto.

Example I 400 grams modified casein, as it is, for instance, supplied by the Borden Company under the name Protovac PV-401, were added to 3500 mls. distilled water and then, 70 mls. of 6 normal sodium hydroxide solution were added. The mixture was vigorously stirred for 30 to 60 minutes and kept at a temperature of approximately 70–80° C. The pH was 6.4 to 6.5 and was then adjusted to 6.8. The solution was then diluted with distilled water to 4000 mls. This 10% casein solution was used for the preparation of photographic emulsions.

Example II 90 grams of silver nitrate were dissolved in 800 mls. of distilled water at 25° C. 65 grams of potassium bromide and 4 grams of potassium iodide were dissolved in 200 mls. of distilled water, to which had been added 80 mls. of 10% modified casein-solution. The temperature was adjusted to 77° C. and maintained there throughout the mixing operation. Silver nitrate solution was added to the bromide-iodide-modified casein solution over a period of approximately 20 minutes under continuous stirring. Then were added, 50 mls. more of 10% modified casein solution. After a 5 minute digestion at 77° C., sulfuric acid was added to adjust the pH to 5 so coagulation would occur. The mother liquor was decanted off and the precipitate washed twice with water at 10° C. A solution of 100 grams of gelatin dissolved in 500 cc. water was added during stirring and the pH adjusted to 6.8 with sodium carbonate solution. The temperature was kept at 77° C. until the coagulum was completely dispersed. The volume of the batch was brought up to 1000 mls. by the addition of more distilled water. The temperature was then lowered to 60° C. and the batch was digested at this temperature under agitation while adding conventional chemical ripeners and stabilizers. The emulsion was then processed and coated in the usual manner.

*Example III*

90 grams of silver nitrate were dissolved in 900 mls. of distilled water at 25° C. 65 grams of potassium bromide and 4.5 grams of potassium iodide were dissolved in 400 mls. of distilled water to which had been added 130 mls. of 10% modified casein solution. The temperature was adjusted to 75° C. and maintained during the mixing. Silver nitrate solution was added to the above solution over a period of 30 minutes under continuous stirring. After a 5 minute digestion at 75° C., coagulation was affected as in Example II, and the process completed in the same fashion as described in Example II.

We claim:

1. A method of preparing silver-halide dispersions which comprises reacting a water soluble silver salt with a water soluble halide salt in an aqueous solution of rennet casein, which casein has been treated with an aqueous solution of an alkali metal pyrophosphate to remove insolubles from said casein and precipitating the resulting silver halide and rennet casein.

2. The method as defined in claim 1 wherein the alkali metal pyrophosphate is sodium pyrophosphate.

3. A method of preparing silver-halide emulsions having a high ratio of silver-halide to colloid which comprises reacting a water soluble silver salt with a water soluble halide salt in an aqueous solution of rennet casein which casein has been treated with an aqueous solution of an alkali metal pyrophosphate in order to remove insolubles from said casein, precipitating the resulting silver halide and casein, washing the precipitate and dispersing the washed precipitate in a photographic colloid.

4. A photographic emulsion comprising rennet casein which has been treated with an aqueous solution of an alkali metal pyrophosphate to remove insolubles from said casein, said casein having silver-halide dispersed therein.

5. A photographic emulsion comprising a photographic colloid having uniformly dispersed therein a mixture of silver halide and rennet casein which casein has been pretreated with an aqueous solution of an alkali metal pyrophosphate to remove insolubles therefrom.

6. A photographic emulsion as defined in claim 4 wherein the alkali metal pyrophosphate used in treating said casein is sodium pyrophosphate.

References Cited in the file of this patent

UNITED STATES PATENTS

| | | |
|---|---|---|
| 705,643 | Buss | July 29, 1902 |
| 797,458 | Rompler | Aug. 15, 1905 |
| 2,293,385 | Dunham | Aug. 18, 1942 |
| 2,691,582 | Lowe et al. | Oct. 12, 1954 |
| 2,716,061 | Lupo | Aug. 23, 1955 |